United States Patent [19]
Chawla

[11] Patent Number: 6,108,695
[45] Date of Patent: *Aug. 22, 2000

[54] METHOD AND APPARATUS FOR PROVIDING ANALOG OUTPUT AND MANAGING CHANNELS ON A MULTIPLE CHANNEL DIGITAL MEDIA SERVER

[75] Inventor: Rajeev Chawla, Fremont, Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/881,526

[22] Filed: Jun. 24, 1997

[51] Int. Cl.$^7$ .............................. H04N 7/10; G06F 17/60
[52] U.S. Cl. .............................. 709/217; 709/225; 348/7
[58] Field of Search .................... 348/7, 12, 10, 348/13; 455/5.1, 6.2; 709/217, 229, 223, 224, 225

[56] References Cited

U.S. PATENT DOCUMENTS

| | | | |
|---|---|---|---|
| Re. 34,611 | 5/1994 | Fenwick et al. | 348/7 |
| 4,381,522 | 4/1983 | Lambert | 348/7 |
| 4,450,477 | 5/1984 | Lovett | 348/7 |
| 4,567,512 | 1/1986 | Abraham | 348/7 |
| 5,206,722 | 4/1993 | Kwan | 348/7 |
| 5,323,234 | 6/1994 | Kawasaki | 348/6 |
| 5,729,279 | 3/1998 | Fuller | 348/7 |
| 5,926,624 | 7/1999 | Katz et al. | 395/200.47 |
| 5,969,632 | 10/1999 | Diamant et al. | 340/825.32 |
| 6,032,194 | 10/1999 | Cogger et al. | 709/223 |

OTHER PUBLICATIONS (Jane Radatz, IEEE Standard Dictionary of Electrical and Electronic Terms, Sixth Edition) Dec. 1996.

*Primary Examiner*—Andrew I. Faile
*Assistant Examiner*—Reuben M. Brown
*Attorney, Agent, or Firm*—Blakely Sokoloff Taylor & Zafman

[57] ABSTRACT

A method and apparatus for providing analog output and managing channels on a multiple channel digital media server are provided. A mapping is established between a number of converter channels and a number of frequencies of the media server. A mapping is also established among SCSI ports of the media server. At least one of a number of converter channels and at least one of a number of frequencies are allocated to at least one user in accordance with the established mapping. Digital video data is converted to analog video data using at least one of the number of allocated converter channels. The analog data is transmitted to clients using the frequencies. The analog data may be modulated to produce cable television signals or modulated to produce ultrahigh frequency and very high frequency television signals.

23 Claims, 8 Drawing Sheets

METHOD AND APPARATUS FOR PROVIDING ANALOG OUTPUT AND MANAGING CHANNELS ON A MULTIPLE CHANNEL DIGITAL MEDIA SERVER

FIELD OF THE INVENTION

This invention relates to media server systems. More particularly, this invention relates to providing analog output and managing channels on a multiple channel media server system.

BACKGROUND OF THE INVENTION

A typical media server system consists of a video server connected to clients via a high speed network. The media server is capable of delivering video to these clients for real-time playback, the video delivery being client driven. Clients communicate with the server to control video play, playback speed (normal, fast-forward, rewind, stop, pause), and build playlists. All references to video and video data herein include the corresponding audio and audio data.

The media server is generally a combination of standard server hardware and software that is optimized for and dedicated to the storage and delivery of digital video and audio streams. One prior art example of such a media server is the direct satellite broadcast system. The direct satellite broadcst system broadcasts digital streams which are decoded at the receiver end by a set-top box. As digital streams are delivered to the viewer, an expensive converter is required in the set-top box to decompress and decode the digital streams.

In another prior art media server system, the digital Sun™ MediaCenter™ manufactured by Sun Microsystems Computer Company of Mountain View, Calif., the server software includes a kernel, network interface drivers dedicated to continuous-media output, a Media File System (MFS) optimized for the demands of the delivery of isochronous bit streams, a Media Stream Manager (MSM) that controls the playback of multimedia streams that are stored on the media server, and a Content Manager (CM) that allows users to move content between servers or between a server and a client. The Sun™ MediaCenter™ server delivers Motion Picture Experts Group (MPEG) bit streams at a constant bit rate. The content of the streams are stored on an array of disks. The server guarantees that, unless the server hardware fails, once a stream request is accepted, it will be delivered at the specified constant bit rate until the stream ends or the server is told to stop.

Some prior art media servers are designed to output digital streams using asynchronous transfer mode (ATM) or local-area networks (LAN). In an ATM environment, one or more media servers are directly connected to an ATM switch via ATM host adapters. Digital video streams are sent to clients using ATM virtual circuits. In the LAN environment, each media server is connected on one high-speed 100BaseT subnetwork via one or more ethernet host adapters. Digital video streams are sent to their destinations using LAN packets. Destination clients can access the video streams by connecting directly to one of the 100BaseT networks.

In the previously discussed digital Sun™ MediaCenter™ server, the Media Stream Manager (MSM) that provides users access to the server uses a MSM Client Application Programmer's Interface (MSMC API) that allows the manipulation of video stream playback on the server. The MSM is a layer of application server software that allows the user to control and manipulate playback of video streams using the MSMC API. For example, it implements the functionality that enables fast forward, rewind, and other operations on video streams. The MSM is layered directly on top of the MFS.

A first scenario of the MSMC API's position in a prior art digital server environment consists of a workstation client using the MSMC API to control the playback of digital video streams to itself. A second scenario of the MSMC API's position in a prior art digital server environment consists of a non-video on-demand application that uses the MSMC API to control the playback of digital video streams to remote clients. A third scenario of the MSMC API's position in a prior art digital server environment consists of a video on-demand application that acts as a proxy to translate control commands originating from a set-top into equivalent MSMC API calls to the media server. The media server plays the digital video streams to the set-top directly, but the control commands from the set-top are routed via the proxy application, which translates the set-top command control protocol to the MSMC API.

Full-motion uncompressed digital video demands a large storage space, and a high data transfer rate. Thus, the digital video is compressed before storing it on a video server. The MPEG-1 and MPEG-2 are commonly used encoding standards for representing digitally encoded and compressed video and audio streams. A client wishing to playback a video stored on a media server must decompress and decode the digital video stream delivered by the video server. Decompressing and decoding by the client requires a great deal of computer processing and a large amount of computer memory. Consequently, it is desirable to decompress and decode the digital video prior to delivery to a client so as to deliver analog video to the client. This allows delivery of video in the existing cable network infrastructure. It also eliminates the need for an expensive MPEG decoder in the set-top box at the user client receiver. It is also desirable to efficiently manage and control decoding channel allocation and deallocation in the multiple channel digital media server.

SUMMARY OF THE INVENTION

A method and apparatus for providing analog output and managing channels on a multiple channel digital media server are provided. According to one aspect of the invention, a mapping is established between a number of converter channels and a number of frequencies of the media server. A mapping is also established among a plurality of small computer standard interface ports. At least one of a number of converter channels are allocated to at least one user in accordance with the established mapping. Digital video data is converted to analog video data using at least one of the number of allocated converter channels. The analog data is transmitted to clients through the converter channel. The analog data may be modulated to produce cable television signals or modulated to produce ultrahigh frequency and very high frequency television signals.

In one embodiment the media server apparatus generally includes at least one transmission channel for transmission of analog data to at least one user. Moreover, the apparatus includes at least one decoder configured to be coupled to the transmission channels. The decoder converts digital video data to analog data. Furthermore, the apparatus includes a channel selection manager that allocates at least one of a number of decoder channels and at least one of a number of transmission channels to at least one user according to a mapping established by the channel selection manager. The channel selection manager, implemented as a kernel driver, controls allocation and deallocation of the decoder channels and transmission channels in response to user communications.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

A method and apparatus for providing analog output and managing channels on a multiple channel digital media server are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
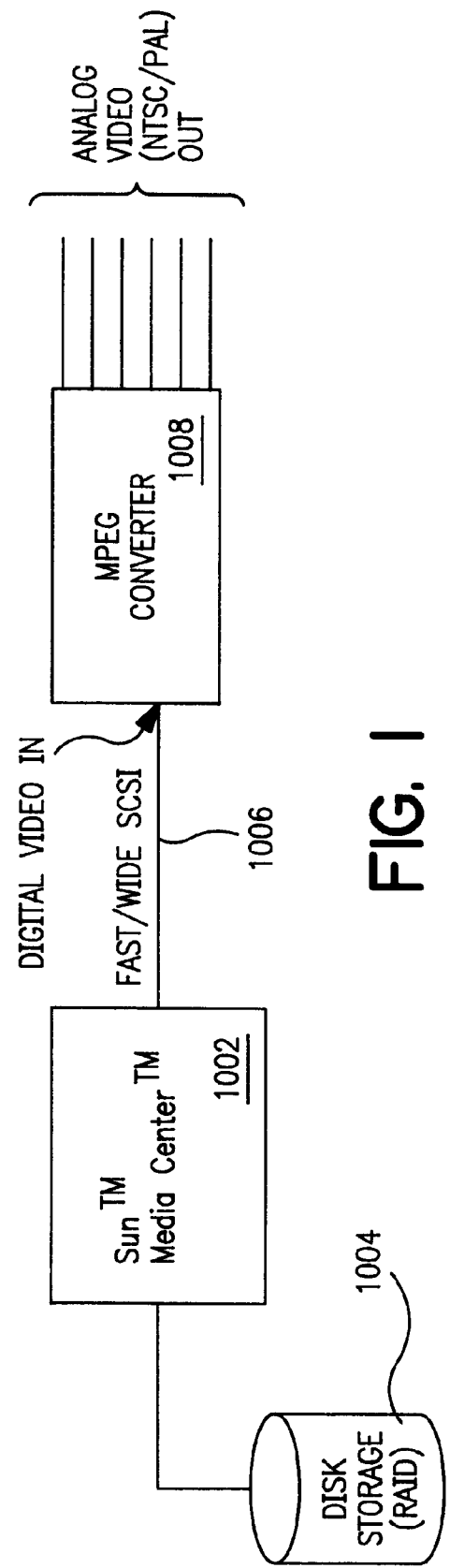
FIG. 1 illustrates the overall architecture for providing analog video in one embodiment of the present invention.

FIG. 1 illustrates the overall architecture for providing analog video in one embodiment of the present invention. The Sun™ MediaCenter™ media server 1002 stores content in disk storage 1004. The disk storage 1004 may comprise an array of disks. The media server 1002 is connected through a small computer standard interface (SCSI) bus 1006 to one or more MPEG converters 1008. The MPEG converters 1008 decompress and decode digital video and audio data. In one embodiment of the present invention, MPEG converters are used having 6 channels. Each of the MPEG converters 1008 produces analog baseband data.

Figure 2:
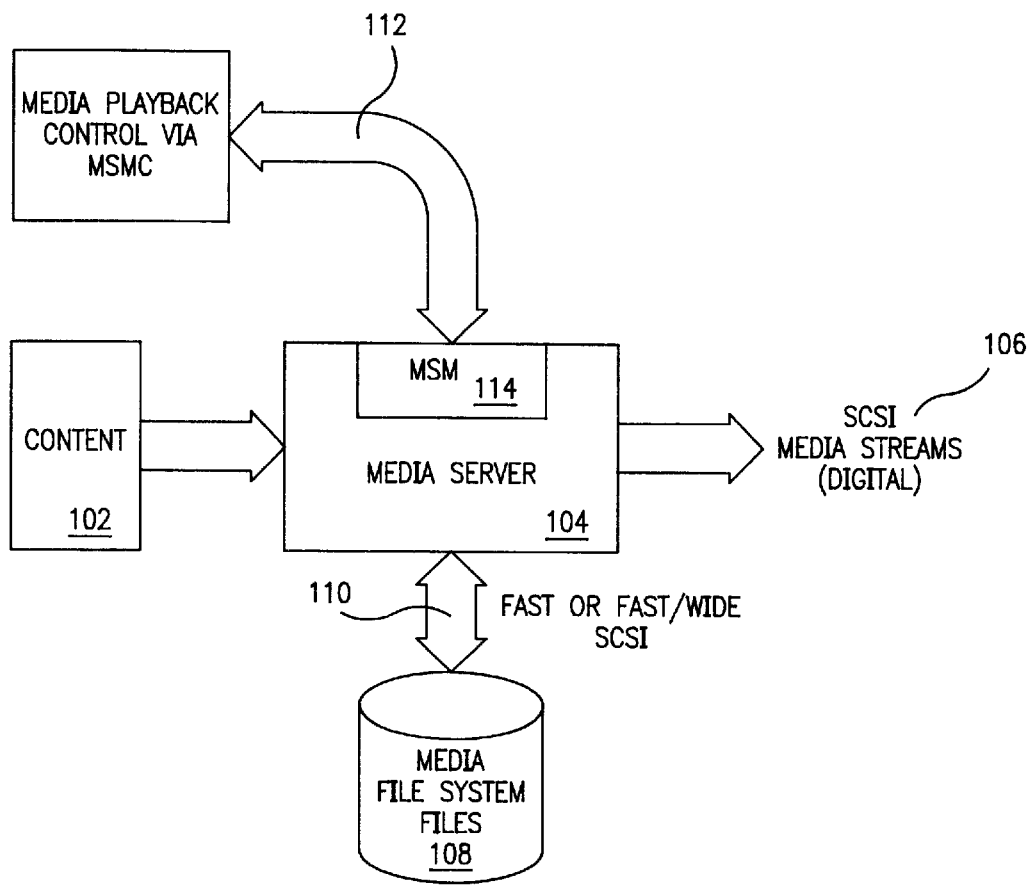
FIG. 2 illustrates the hardware architecture of one embodiment of the media server of the present invention.

FIG. 2 illustrates the hardware architecture of one embodiment of the media server of the present invention. Content 102 is loaded onto the media server 104 via the server's Content Manager. The content 102 source may be, but is not limited to, tape, network-accessible files, or live sources. External disk subsystems 108 are dedicated to the storage of multimedia files. Fast or Fast/Wide SCSIs 110 couple the external disk subsystems 108 to the media server 104. The SCSI digital video streams 106 are controlled through network interfaces 112 using the Media Stream Manager 114.

Figure 3:
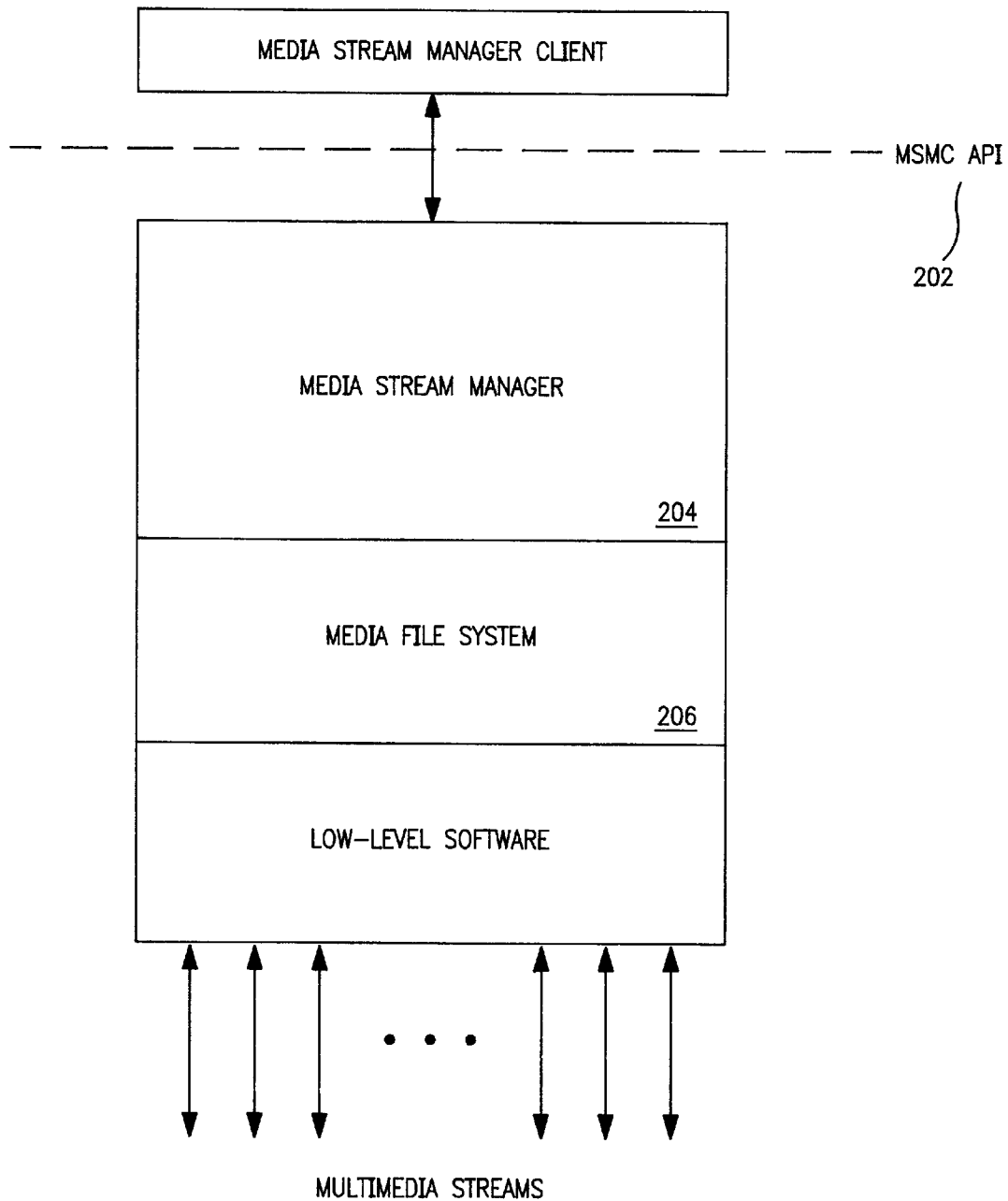
FIG. 3 illustrates the Media Stream Manager Client Application Programmer's Interface's (MSMC API's) position in the server architecture.

FIG. 3 illustrates the MSMC API's 202 place in the server architecture. The MSM 204 is a layer of application server software that allows the user to control and manipulate video streams using the MSMC API 202. For example, it implements the functionality that enables fast forward, rewind, and other operations on video streams. The MSM 204 is layered directly on top of the MFS 206.

Figure 4:
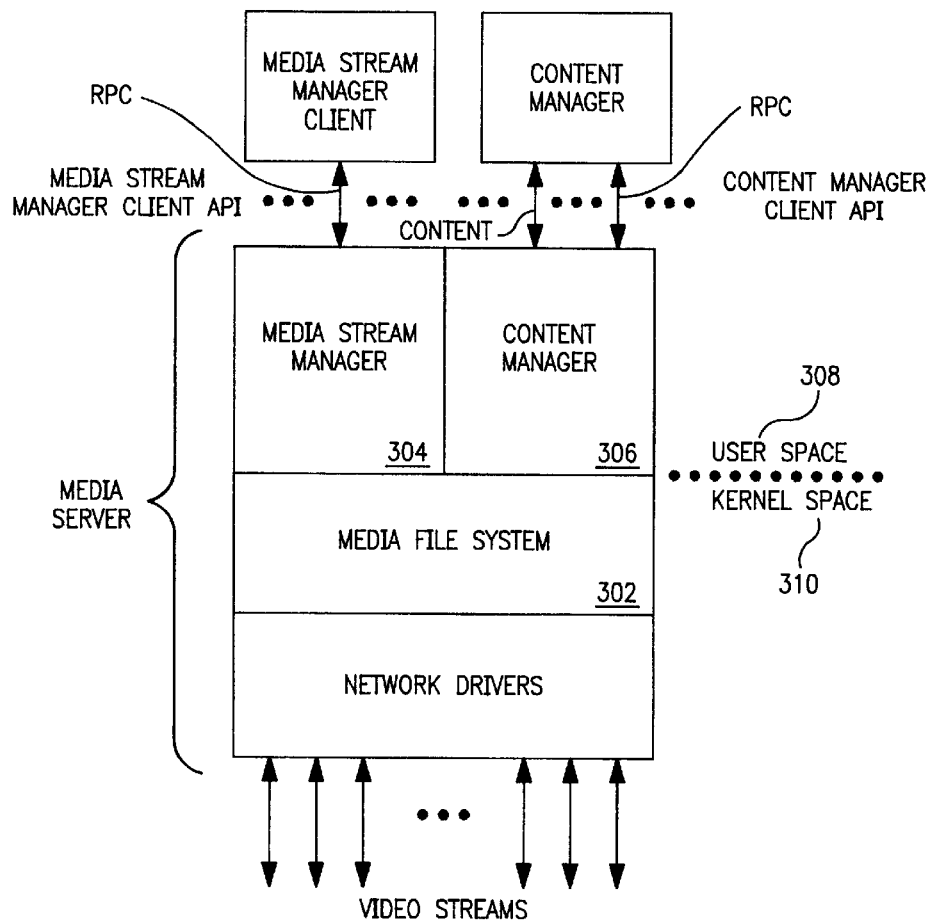
FIG. 4 illustrates the relationship between the major software components of the media server of one embodiment of the present invention.

FIG. 4 illustrates the relationship between the major software components of the media server of one embodiment of the present invention. The major server software components include the Media File System 302, the Media Stream Manager 304, and the Content Manager 306. The MSM 304 and the CM 306 both reside in user space 308.

Figure 5:
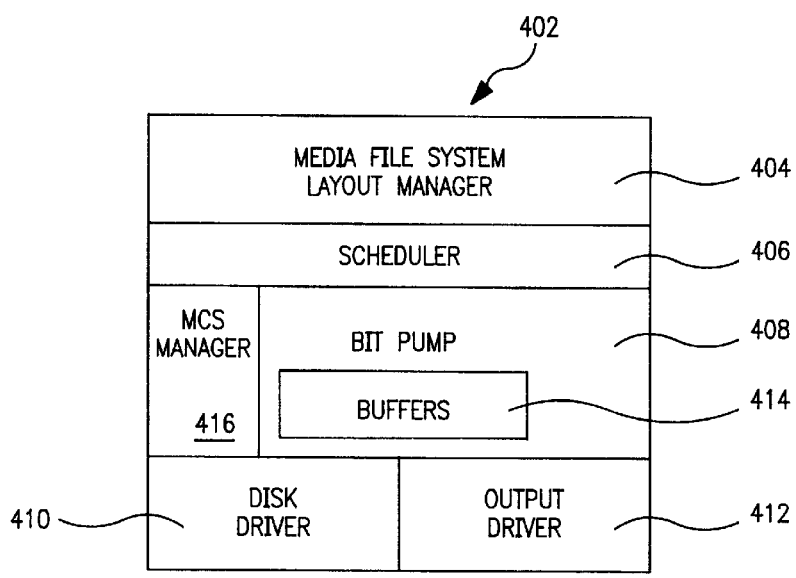
FIG. 5 illustrates the basic subsystems of the Media File System (MFS) of one embodiment of the present invention.

The MFS 302 is optimized for the demands of the delivery of isochronous bit streams and, as such, is designed to deliver multimedia data from an array of attached disks to an output network. FIG. 5 illustrates the basic subsystems of the MFS 402 of one embodiment of the present invention. The basic subsystems include a file system layout manager 404, a scheduler 406, a bit pump 408, a disk driver 410, and an output driver 412. The file system layout manager 404 allocates and deallocates disk blocks to media server files. The scheduler 406 sorts and schedules disk input/output, manages bit pump buffers 414, performs admission control, and schedules output driver 412 activity. The bit pump 408 allocates internal buffering and efficiently transfers data between the disk 410 and the output drivers 412 using the internal buffers 414. The bit pump 408 is dependent on the SCSI output driver. The disk driver 410 efficiently transfers disk data to the internal buffers 414. The output driver 412 is responsible for low-level output device management and encapsulating outgoing data, and for efficiently transferring data from the internal buffers 414 to the output medium. The scheduler 406, bit pump 408, and the media channel selection manager 416 reside in kernel space.

Referring again to FIG. 4, the MSM 304 provides users access to the media server by controlling the video streams stored in the MFS. The MSM implements a set of procedures that interact with the MFS to allow the user to stop, start, pause, and resume video bit streams. A central notion of the MSM is a playlist, from which titles can be played on a time-synchronized basis. Each playlist is associated with a player, which can be passed among multiple clients.

The CM 306 provides for the loading of content onto the media server. The CM 306 allows users to move content between servers or between a server and a client.

Figure 6:
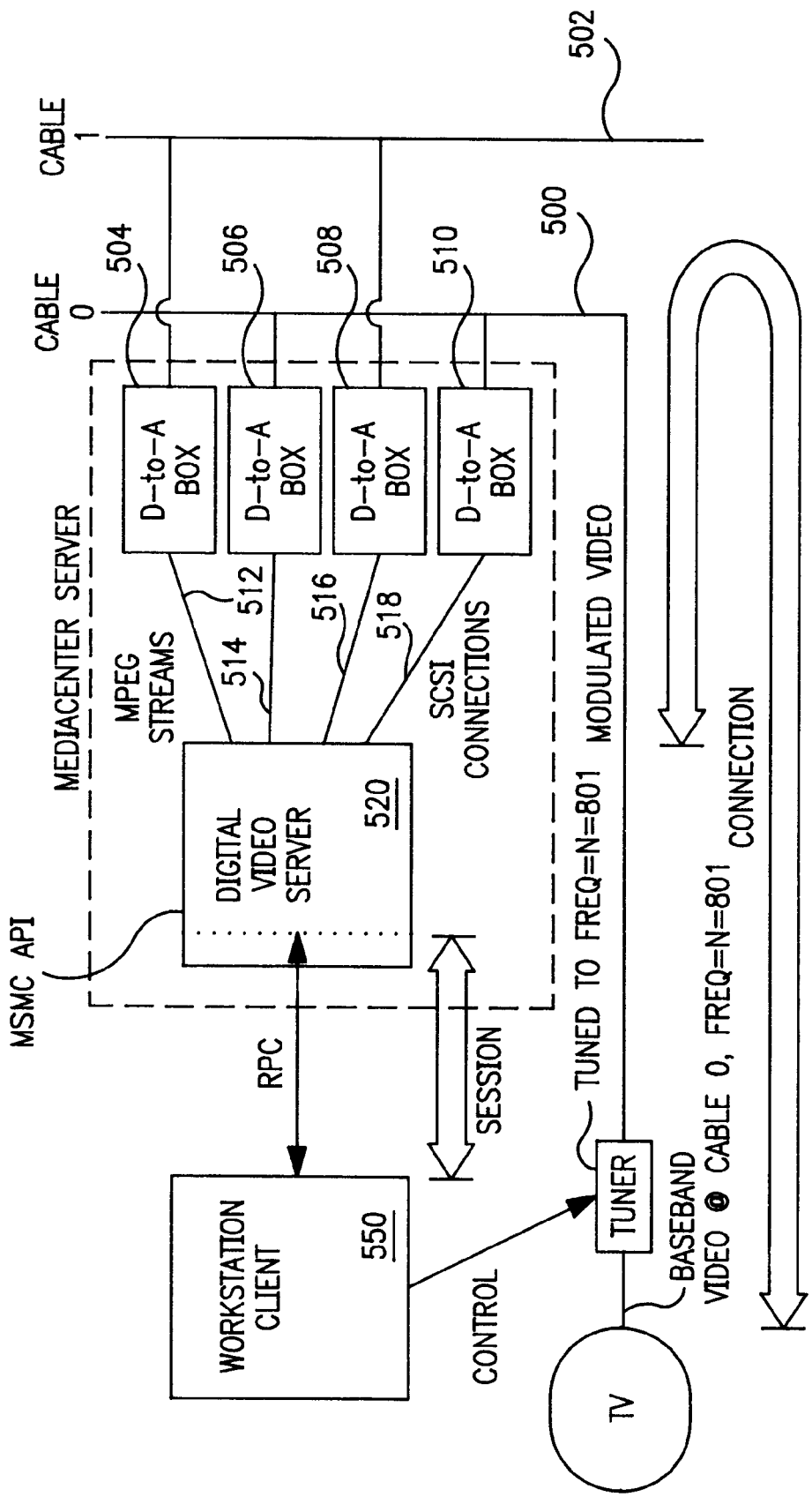
FIG. 6 illustrates the media server for providing analog video output in one embodiment of the present invention.

FIG. 6 illustrates the media server for providing analog video output in one embodiment of the present invention. This media server system is coupled to transmission channels 500 and 502 for transmission of analog video and audio data to at least one user or client 550. In one embodiment, transmission channels 500 and 502 are two of a number of channels comprising a high-speed network over which modulated video and audio are transmitted to clients. The transmission channels 500 and 502 are coupled to the output ports of converters or decoders 504–510.

An embodiment of the media server has, but is not limited to, four converters wherein each converter contains, but is not limited to, six channel cards. Thus, a group of four MPEG converters collectively provide 24 channels. The converters 504–510 decompress digital video and audio data and convert or decode the digital video and audio data to analog video and audio data thereby providing analog baseband data. The converters 504–510 are coupled to the video server 520 using SCSI buses 512–518. The converters 504–510 receive video streams from the video server over the SCSI buses 512–518. The media server system uses modulators that modulate the analog baseband video and audio signals with a carrier frequency to produce cable television signals. These decoders accept, but are not limited to, MPEG-2 video streams. The cable television signals are delivered to a cable transmission system or network. In another embodiment of the media server of the present invention, decoders modulate the analog baseband video and audio signals with a carrier frequency to produce ultrahigh frequency and very high frequency television signals for broadcast.

An embodiment of the media server of the present invention uses a converter having multiple converting channels, and uses a media server system having multiple converters. The media server must manage these multiple converting channels and must manage the timely delivery of digital video and audio data to these converting channels. Once the digital video and audio data is converted to analog video and audio data, the media server uses multiple frequencies and multiple paths over a cable network to deliver the analog video and audio data to clients. Therefore, a Media Channel Selection (MCS) manager is implemented in one embodiment of the present invention in order to manage the channels on the multiple channel media server.

The MCS manager manages a profile of the media server system and controls the allocation and deallocation of channels based on this system profile. The MCS manager establishes a mapping among analog modulation frequencies, SCSI port logical unit numbers, specific decoder cards within converters and specific cables, systems, and networks. Furthermore, the MCS manger allocates and deallocates the aforementioned resources in response to the established mapping and user communications. The MCS manager is implemented as a kernel driver in kernel space as part of the operating system of the media server. The bit pump of the MFS is responsible for timely delivery of video and audio data. Consequently, the MCS manager is optimized to talk to the bit pump directly with regards to allocating and deallocating channels. This direct communication with the bit pump allows for a non-intrusive management of the decoding channels. Implementation of the MCS manager in the kernel prevents leaking of freed channels when a playback is aborted.

Figure 7:
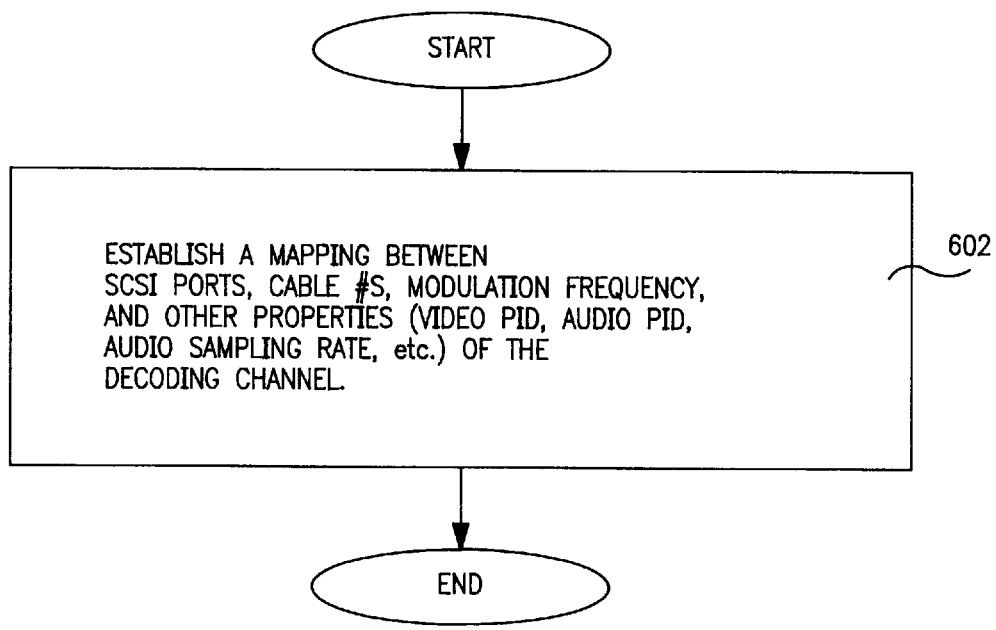
FIG. 7 illustrates a flowchart for initialization of the Media Channel Selection (MCS) manager in one embodiment of the present invention.

At media server system startup, the MCS manager is initialized. FIG. 7 illustrates a flowchart for initialization of the MCS manager in one embodiment of the present invention. At initialization, step 602, a mapping is established among decoder channels, the SCSI ports through which the media server is coupled to the converters, a cable number to which the decoding channels are connected, the output ports of the media server, and the default modulation frequency for the corresponding decoding channels. A mapping is also established among the video program identification, the audio program identification, and the data sampling rate properties of the media server, at step 602.

Following initialization of the MCS manager, the media server may receive client requests from, for example, a set-top box. When a client communicates to the media server MSM to start playback of a video, the media server must allocate a decoding channel for this client. The MSM client specifies a value that maps to a specific decoder box and, potentially, a specific channel card within that decoder. The bit pump communicates with the MCS manager to allocate a channel. The provisions are also made for the client to pick a particular channel if the client so chooses. The MCS manager allocates a channel and directs the bit pump to deliver video and audio on that channel. The MCS manager also communicates with the decoder box to set the modulation frequency of that channel to that specified by the client or the default modulation frequency as determined at initialization.

Figure 8:
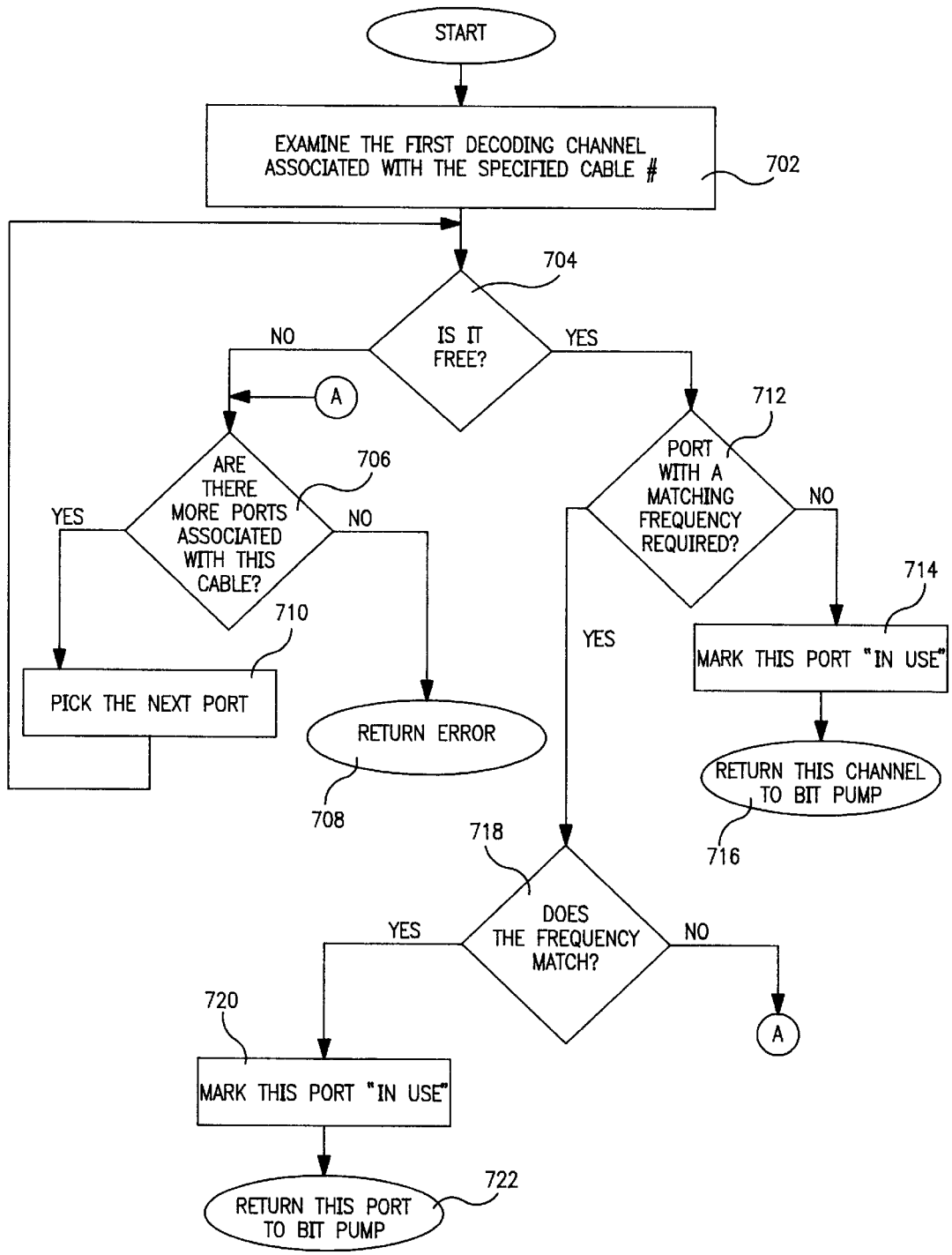
FIG. 8 illustrates a flowchart for channel allocation in one embodiment of the present invention.

FIG. 8 illustrates a flowchart for channel allocation in one embodiment of the present invention. The MCS manager begins by examining the first decoding channel associated with a specified cable number at step 702. The MCS manager must then decide if the first decoding channel is free at step 704. If the first decoding channel is not free then the MCS manager determines whether there are more ports associated with the specified cable number at step 706. If there are no more ports associated with the specified cable then an error is generated at step 708. If there are more ports associated with the specified cable then the MCS manager picks the next port at step 710 and operation returns to step 704.

If the first decoding channel is determined to be free at step 704, then the MCS manager determines whether a port with a matching frequency is required at step 712. If a port with a matching frequency is not required, then the port associated with the specified cable number is marked as being in use at step 714, and the first decoding channel is returned to the bit pump at step 716.

If a port with a matching frequency is determined to be required at step 712, then the MCS manager determines whether the frequency of the port matches the frequency of the decoding channel at step 718. If the frequency of the port does not match the frequency of the decoding channel, then operation continues at step 706 where the MCS manager determines whether there are more ports associated with the specified cable number. If the frequency of the port does match the frequency of the decoding channel, then the port associated with the specified cable number is marked as being in use at step 720, and the first decoding channel is returned to the bit pump at step 722.

Figure 9:
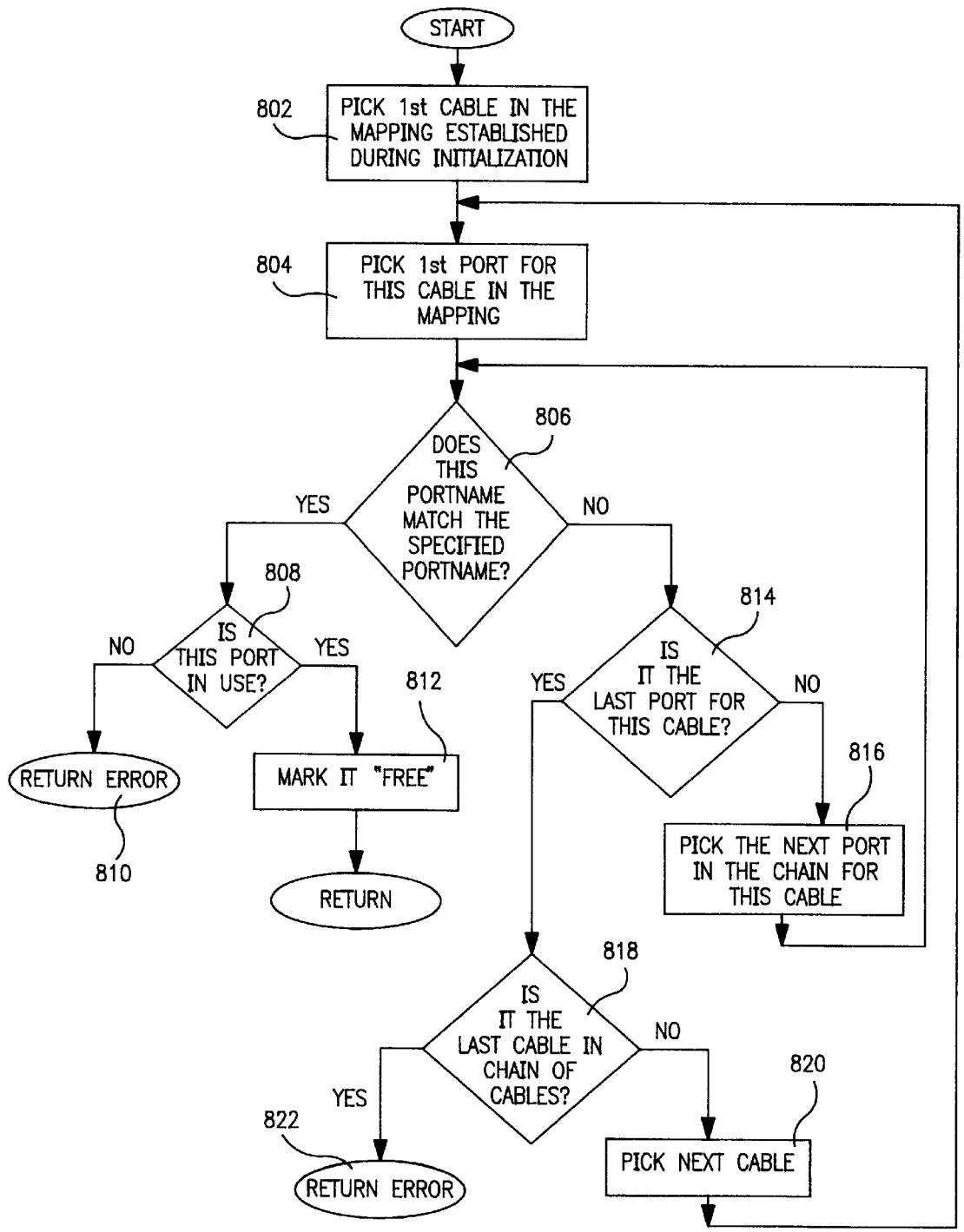
FIG. 9 illustrates a flowchart for channel deallocation in one embodiment of the present invention.

At the end of a video playback, the bit pump communicates with the MCS manager to deallocate the channel previously allocated for the video delivery and makes the channel available for future use. FIG. 9 illustrates a flowchart for channel deallocation in one embodiment of the present invention. The MCS manager selects the first cable in the mapping established during the initialization, at step 802. The first port is then selected for this first cable in the mapping, at step 804. The MCS manager then determines, at step 806, whether the port name of the first port matches the specified port name. If the port name of the first port matches the specified port name then it must be determined whether this port is in use, at step 808. If it is determined that the port is not in use, then a return error is generated at step 810. If it is determined that the port is in use, then the port is marked as being free at step 812.

If the port name of the first port does not match the specified port name at step 806, then the MCS manager determines whether the specified port is the last port for the specified cable, at step 814. If the specified port is not the last port for the specified cable, then the next port in the chain is picked for the specified cable, at step 816, and operation returns to step 806.

If it is determined that the specified port is the last port for the specified cable at step 814, then it is determined whether the specified cable is the last cable in the chain of cables, at step 818. If the cable is not the last cable in the chain of cables, then the next cable is selected at step 820, and operation returns to step 804. If the cable is the last cable in the chain of cables, then an error is generated at step 822.

Thus, a method and apparatus for providing analog output and managing channels on a multiple channel digital media server have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for delivering analog data on demand from a multiple channel digital media server, the media server having public space and private space, wherein the public space is coupled to a Media Stream Manager Client (MSMC) and wherein the private space is not accessible to the Media Stream Manager Client (MSMC), the method comprising:

establishing a mapping among a plurality of converter channels, a plurality of frequencies of the media server, a plurality of ports of the media server, and a plurality of cable numbers to which the plurality of converter channels are coupled;

receiving a request for analog data playback in the Media Stream Manager Client (MSMC);

in response to the data request, transmitting to the public space of the media server a value that maps to a specific converter channel;

relying the value from the public space to the private space of the media server as a converter channel allocation command by employing Media Stream Manager (MSM) software;

directly communicating the converter channel allocation command from a first location in the private space by employing bit pump software to a second location in the private space, the second location having Media Channel Selection (MCS) manager software;

allocating at least one of the plurality of converter channels and at least one of the plurality of frequencies to at least one user receiver in accordance with the established mapping by employing the MCS manager software;

converting digital video data to analog data using the at least one allocated converter channel; and transmitting the analog data using the at least one of the plurality of frequencies.

2. The method of claim 1, further comprising the step of modulating the analog data to produce cable television signals.

3. The method of claim 1, further comprising the step of modulating the analog data to produce ultrahigh frequency and very high frequency television signals.

4. The method of claim 1, further comprising the step of converting digital video data to analog data using a motion pictures expert group (MPEG) decoder, the MPEG decoder providing a plurality of channels of modulated video output over a high-speed network.

5. The method of claim 4, further comprising the step of transmitting data from the multiple channel media server to the MPEG decoder over a small computer standard interface (SCSI).

6. The method of claim 1, further comprising the step of managing an allocation and a deallocation of the plurality of converter channels in response to user communications, the management of the plurality of converter channels being implemented as a kernel driver in the multiple channel media server.

7. The method of claim 1, further comprising the step of establishing a mapping of a small computer standard interface (SCSI) port of the multiple channel media server.

8. A media server system for transmission of analog data to at least one user receiver, the system comprising:

at least one transmission channel;

at least one decoder coupled to the at least one transmission channel, the at least one decoder having means for converting digital video data to analog data;

a media server having a computer readable storage medium, the computer readable storage medium having a first portion that can be accessed by the at least one user receiver and a second portion that is restricted from access by the at least one user receiver, the first portion containing executable computer program instructions identified as Media Stream Manager (MSM) software, the second portion containing executable computer program instructions identified as a media channel selection (MCS) manager that is in direct communication with a bit pump software located in the second portion, the media channel selection manager software having means for allocating at least one of a plurality of decoder channels and at least one of a plurality of transmission channels to at least one user receiver according to a mapping established by the media channel selection manager (MCS) software, wherein the mapping is established among the plurality of decoder channels, a plurality of frequencies of the media server system, a plurality of ports of the media server system, and a plurality of cable numbers to which the plurality of decoder channels are coupled.

9. The media server system of claim 8, wherein the channel selection manager controls an allocation and a deallocation of the at least one of a plurality of decoder channels and the at least one of a plurality of transmission channels in response to communications from the at least one user.

10. The media server system of claim 8, wherein the at least one decoder modulates the analog data to produce cable television signals.

11. The media server system of claim 8, wherein the at least one decoder modulates the analog data to produce ultrahigh frequency and very high frequency television signals.

12. The media server system of claim 8, wherein the at least one decoder is coupled to a video storage server using a small computer standard interface (SCSI).

13. The media server system of claim 8, wherein the channel selection manager is implemented as a kernel driver.

14. The media server system of claim 8, wherein the at least one decoder is a motion pictures expert group (MPEG) decoder, the MPEG decoder providing a plurality of channels of modulated video output over a high-speed network.

15. The media server system of claim 8, wherein the channel selection manager allocates at least one of a plurality of frequencies and at least one of a plurality of small computer standard interface (SCSI) ports according to a mapping established by the channel selection manager.

16. A computer readable storage medium containing executable computer program instructions which, when executed, causes a multiple channel media server to perform a method comprising:

establishing a mapping among a plurality of converter channels, a plurality of frequencies of the media server, a plurality of ports of the media server, and a plurality of cable numbers to which the plurality of converter channels are coupled;

receiving a request for analog data playback in a Media Stream Manager Client (MSMC) coupled to an open space within the media server, the media server further having a transparent space, wherein the transparent space is not accessible to the Media Stream Manager Client (MSMC);

in response to the data request, transmitting to the public space of the media server a value that maps to a specific converter channel;

relying the value from the public space to the private space of the media server as a converter channel allocation command by employing Media Stream Manager (MSM) software;

directly communicating the converter channel allocation command from a open location in the private space by employing bit pump software to a transparent location in the private space, the transparent location having Media Channel Selection (MCS) manager software;

allocating at least one of the plurality of converter channels and at least one of the plurality of frequencies to at least one user receiver in accordance with the established mapping by employing the MCS manager software;

converting digital video data to analog data using the at least one allocated converter channel; and transmitting the analog data using the at least one of the plurality of frequencies.

17. The computer readable medium of claim 16, wherein the processing system is further configured to perform the step of modulating the analog data to produce cable television signals.

18. The computer readable medium of claim 16, wherein the processing system is further configured to perform the step of modulating the analog data to produce ultrahigh frequency and very high frequency television signals.

19. The computer readable medium of claim 16, wherein the processing system is further configured to perform the steps of:

transmitting data from the multiple channel media server to a motion pictures expert group (MPEG) decoder over a small computer standard interface (SCSI);

converting digital video data to analog data using the MPEG decoder, the MPEG decoder providing a plurality of channels of modulated video output over a high-speed network.

20. The computer readable medium of claim 16, wherein the processing system is further configured to perform the step of managing an allocation and a deallocation of the plurality of converter channels in response to user communications, wherein the management of the plurality of converter channels is implemented as a kernel driver in the multiple channel media server.

21. A hardware architecture for providing analog media streams to a user receiver over a cable network infrastructure, the hardware architecture comprising:

a Media Stream Manager Client (MSMC) coupled to the user receiver over the cable network infrastructure;

a disk storage having an array of disks having blocks;

at least one Motion Picture Experts Group (MPEG) converter coupled to the user receiver over the cable network infrastructure, the at least one MPEG converter having a plurality of channels;

a plurality of small computer standard interface (SCSI) buses;

a MSMC Application Program Interface (MSMC API);

a media server coupled to the MSMC through the MSMC API and to the at least one MPEG converter through a SCSI bus, the media server divided into public space and private space, the media server having a first layer located in the public space and containing executable computer program instructions identified as Media Stream Manager (MSM) software which, when executed by the user receiver over the MSMC API, permit the user receiver to control and manipulate the analog media streams, a second layer located in the public space and containing executable computer program instructions identified as Content Manager (CM) software which, when executed by the user receiver over the MSMC API, permit the user receiver to move content external to the media server, a third layer located directly below the first layer and coupled to the disk storage through a SCSI bus, the third layer containing executable computer program instructions identified as Media File System (MFS) software which, when executed, transfers digital media data as media streams from the disk storage to the at least one MPEG converter over the SCSI bus, the Media File System (MFS) software including a Layout Manager software which, when executed, dedicates the blocks in the array of disks of the disk storage to the storage of digital media data files, a Scheduler software located in the private space, which, when the Scheduler software is executed, a Bit Pump software located in the private space, which, when the Bit Pump software is executed, buffers digital media data being transferred from disk storage to the at least one MPEG converter.

22. The hardware architecture of claim 21, wherein the at least one MPEG converter include four converters, each coupled to the media server through a cable in the SCSI bus, and wherein the plurality of channels include six channels, the Media File System (MFS) software further including a Media Channel Selection (MSC) manager software, located in the private space in direct communication with the Bit Pump software, which, when the MCS manager software is executed, allocates the four cables and the six channels between at least two user receivers according to a mapping established by the MCS manager.

23. The hardware architecture of claim 21, wherein the mapping established by the MCS manager is established among the four cables, the six channels, and a plurality of modulation frequencies.

\* \* \* \* \*